United States Patent
Ferencz et al.

(10) Patent No.: US 7,238,313 B2
(45) Date of Patent: *Jul. 3, 2007

(54) THERMOPLASTIC CONSTRUCTS WITH IMPROVED SOFTNESS

(75) Inventors: Richard Ferencz, Isle of Palms, NC (US); Robert Dale, Lawrenceville, GA (US); Nick Carter, Mooresville, NC (US); Lei Wang, Mooresville, NC (US)

(73) Assignee: Polymer Group, Inc., Charlotte, NC (US)

( * ) Notice: Subject to any disclaimer, the term of this patent is extended or adjusted under 35 U.S.C. 154(b) by 139 days.

This patent is subject to a terminal disclaimer.

(21) Appl. No.: 10/214,071

(22) Filed: Aug. 7, 2002

(65) Prior Publication Data

US 2003/0049989 A1    Mar. 13, 2003

Related U.S. Application Data

(60) Provisional application No. 60/310,626, filed on Aug. 7, 2001.

(51) Int. Cl.
*B29C 47/00* (2006.01)

(52) U.S. Cl. .................................................. 264/211

(58) Field of Classification Search ................ 264/211; 442/327, 351, 361, 400, 401; 524/210, 230, 524/232
See application file for complete search history.

(56) References Cited

U.S. PATENT DOCUMENTS

| | | | | |
|---|---|---|---|---|
| 3,454,519 | A | * | 7/1969 | Cervini et al. ............... 524/232 |
| 3,562,291 | A | * | 2/1971 | Lutzmann et al. ...... 524/230 X |
| 3,891,587 | A | * | 6/1975 | Watts ....................... 524/232 X |
| 4,041,203 | A | | 8/1977 | Brock et al. |
| 4,329,309 | A | | 5/1982 | Kelly |
| 4,381,326 | A | | 4/1983 | Kelly |
| 4,452,845 | A | * | 6/1984 | Lloyd et al. ................... 602/52 |
| 5,178,931 | A | | 1/1993 | Perkins et al. |
| 5,300,167 | A | | 4/1994 | Nohr et al. |
| 5,569,732 | A | | 10/1996 | Nohr et al. |
| 5,582,904 | A | * | 12/1996 | Harrington .................. 442/364 |
| 5,645,627 | A | | 7/1997 | Lifshutz et al. |
| 5,814,688 | A | | 9/1998 | Hilit et al. |
| 5,854,147 | A | | 12/1998 | Nohr et al. |
| 5,969,026 | A | | 10/1999 | Mor et al. |
| 6,191,211 | B1 | | 2/2001 | Mussell et al. |
| 6,239,047 | B1 | | 5/2001 | Erdos et al. |
| 6,264,864 | B1 | | 7/2001 | Mackay |
| 6,740,609 | B1 | * | 5/2004 | Peng et al. .................. 442/327 |
| 2004/0077248 | A1 | * | 4/2004 | Kurahashi et al. .......... 442/401 |

* cited by examiner

*Primary Examiner*—Leo B. Tentoni
(74) *Attorney, Agent, or Firm*—Wood, Phillips, Katz, Clark & Mortimer

(57) ABSTRACT

The present invention is directed to the combined use of first and second fatty acid amides to improve the softness of a thermoplastic polymer construct. A combination of fatty acid amides is provided in the blend ratio of about 10 to 90 percent by weight of a first fatty acid amide and 90 to 10 percent by weight of a second fatty acid amide. The first and second fatty acid amides are compounded into a thermoplastic polymer carrier resin and, preferentially, produced as concentrate pellets containing 0.5 to 75 percent by weight total fatty acid amide loading. The concentrate pellets are introduced into a thermoplastic polymer base, to form a thermoplastic resin, at a letdown level in the range of about 1 to 15 percent, with the range of 2 to 10 percent being preferred, and the range of 3 to 6 percent being most preferred.

6 Claims, No Drawings

THERMOPLASTIC CONSTRUCTS WITH IMPROVED SOFTNESS

CROSS-REFERENCE TO RELATED APPLICATION

This application claims the benefit of priority of Provisional Application No. 60/310,626, filed on Aug. 7, 2001, the disclosure of which is incorporated herein by reference.

TECHNICAL FIELD

This invention relates to thermoplastic constructs and more particularly, to the combined use of first and second fatty acid amides as melt additives to improve the softness of extruded thermoplastic constructs, such constructs including continuous filaments, microfilaments, staple fibers and films.

BACKGROUND OF THE INVENTION

Thermoplastics are becoming an evermore-popular material to be used in the fabrication of disposable and semi-durable goods. The ability of thermoplastics to be formed into specialized fabrics, both woven and nonwoven, and films designed to meet specific performance requirements has resulted in such thermoplastic materials being incorporated into numerous medical, hygiene, and industrial applications. Research and development are ongoing to modify these thermoplastic materials to further improve or otherwise alter the resulting performance of the thermoplastic materials in the fabricated articles.

Particular focus of this research and development has been to the addition of additives to a thermoplastic polymer base, to thus tailor the performance of the thermoplastic resin. Advances in the modification of thermoplastic polymer performance are evident in exemplary performance additive patents directed to changes in hydrophobicity, hydrophilicity, anti-microbial activity, barrier properties, and retention or dissipation of static charge.

While such additives have successfully modified the performance of the thermoplastic polymer, deleterious effects on the softness qualities of a resulting article are expected. The softness of an article, measured in terms of both tactile and ductile performance, is a critical aspect of the user-acceptance of such articles. A number of patents address specifically the improvement of softness in thermoplastic constructs; however, the associated chemistries are such that they are incompatible with the performance additives.

An unmet need remains for a thermoplastic additive that improves the softness of the resulting article, and yet is compatible with performance additives. Due to the criticality of perceived softness in end-use articles, there is also a need for a softness additive that can be favorably compounded with other softness improvement additives, to render thermoplastic constructs of further improved softness.

SUMMARY OF THE INVENTION

The present invention is directed to the combined use of first and second fatty acid amides to improve the softness of a thermoplastic polymer construct. A combination of fatty acid amides is provided in the blend ratio of about 10 to 90 percent by weight of a first fatty acid amide and 90 to 10 percent by weight of a second fatty acid amide. The first and second fatty acid amides are compounded into a thermoplastic polymer carrier resin and, preferentially, produced as concentrate pellets containing 0.5 to 75 percent by weight total fatty acid amide loading. The concentrate pellets are introduced into a thermoplastic polymer base, to form a thermoplastic resin, at a letdown level in the range of about 1 to 15 percent, with the range of 2 to 10 percent being preferred, and the range of 3 to 6 percent being most preferred.

A fatty acid amide containing thermoplastic resin can then be extruded as multiple and continuous filaments or as a film or film layer. The continuous filaments can be directly integrated into a nonwoven fabric or included as a layer of a nonwoven composite or laminate fabric. In the alternative, the continuous filaments may be bundled and incorporated into a yarn, which in turn, can be used in part or whole as the yarns of a woven or knitted textile fabric. Fatty acid amide films can be cast as a single sheet product or extruded onto a carrier substrate, such as another film, a textile fabric, or a nonwoven fabric.

The extruded multiple and continuous filaments can be optionally imparted with a selected level of crimp, then cut into fibers of finite staple length. These thermoplastic resin staple fibers can then be subsequently used to form textile yarns or carded and integrated into nonwoven fabrics by appropriate means, as exemplified by thermobonding, adhesive bonding, and hydroentanglement technologies.

In addition to the first and second fatty acid amides, additional performance additives can be admixed into the thermoplastic resin. Such performance additives include those directed to modifying the performance of the thermoplastic polymer base. Those that modify the thermoplastic polymer base in terms of hydrophobicity, hydrophilicity, anti-microbial activity, barrier properties, and static charge retention or dissipation exemplify suitable performance additives.

It is within the purview of the present invention that first and second fatty acid amides can be compounded with other softness improvement additives to obtain yet further softness improvement of the thermoplastic resin construct. Suitable softness improvement additives include inert organic materials such as insoluble carbonate salts and inorganic agents such as silicones and siloxanes. Oleic compounds typically utilized in the preparation of cosmetics would also be of consideration.

It is also within the purview of the present invention that the manufacture of homogenous or composite fabrics embodying the principles of the present invention includes the use of a blend of fibers and/or filaments having different composition. Differing thermoplastic polymers can be compounded with the same or different fatty acid amides, and with the same or different performance or softness improvement additives. Further, fatty acid amide fibers and/or filaments may be blended with fibers and/or filaments that have not been modified by the compounding of fatty acid amides. Unmodified fibers and/or filaments are selected from natural or synthetic composition, of homogeneous or mixed fiber length. Suitable natural fibers include, but are not limited to, cotton, wood pulp and viscose rayon. Synthetic fibers, which may be blended in whole or part, include thermoplastic and thermoset polymers. Thermoplastic polymers suitable for blending with fatty acid amide thermoplastic resins include polyolefins, polyamides and polyesters. The thermoplastic polymers may be further selected from homopolymers; copolymers, conjugates and other derivatives including those thermoplastic polymers having incorporated melt additives or surface-active agents.

Multi-component fibers and/or filaments can also be practiced whereby a first thermoplastic polymer composition containing two fatty acid amides is juxtaposed in relationship to a second thermoplastic polymer composition; the second thermoplastic polymer composition being a different thermoplastic polymer than the first thermoplastic polymer, but with the same or lower levels of fatty acid amide softness additives. Multi-component fibers and/or filaments can also include the same first and second thermoplastic polymer compositions, with one or more of the fatty acid amides additives used differing between the two compositions. Additionally, multi-component fibers and/or filaments can be practiced whereby the first thermoplastic polymer contains two fatty acid amides and the second thermoplastic polymer contains either a lower level or no fatty acid amides. The profile of the fiber or filament and the number of thermoplastic polymer compositions juxtaposed is not a limitation to the applicability of the present invention.

Other features and advantages of the present invention will become readily apparent from the following detailed description, the accompanying drawings, and the appended claims.

DETAILED DESCRIPTION

While the present invention is susceptible of embodiment in various forms, hereinafter is described a presently preferred embodiment of the invention, with the understanding that the present disclosure is to be considered as an exemplification of the invention, and is not intended to limit the invention to the specific embodiment illustrated.

The softness of thermoplastic constructs, such as continuous filaments, staple fibers, and film, can be advantageous improved by the combined incorporation of a first and second fatty acid amide. Amides are organic chemicals with a —$CONH_2$ group. These chemical compounds are recognized as amides or acid amides due to their derivation from a carboxylic acid. Carboxylic acids arise in various molecular forms and also constitute for the make up of fatty acids.

Fatty acid amides useful in terms of the present invention, include those of the following general primary amine description:

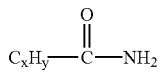

wherein X=the range of 6 to 26 and Y=the range of 13 to 53

The carbon chain of the fatty acid can be of either an alkane, alkene, or alkyne structure, dependent upon the degree of saturation, with a corresponding modification in the value, y. Also, the carbon chain of the fatty acid can exhibit moderate alkyl substitution and bifurcation while maintaining softness improving characteristics.

In addition to the first and second fatty acid amides, additional performance additives can be admixed into the thermoplastic resin. Such performance additives include those directed to modifying the performance of the thermoplastic polymer base. Hydrophobic modification includes the incorporation of hydrophobic agents such as fluorocarbons taught in patent number U.S. Pat. No. 5,178,931, hereby incorporated by reference. Suitable hydrophilic agents include the oleyl ethers included in U.S. Pat. No. 6,239,047 and the use of stearic acids in U.S. Pat. No. 5,969,026, both of which are hereby incorporated by reference. Representative chemistries with anti-microbial activity include the use of quaternary ammonium salts, as is well covered by the combination of patent numbers U.S. Pat. Nos. 5,300,167, 5,569,732, and 5,854,147, all herein incorporated by reference. U.S. Pat. No. 5,645,627, herein incorporated by reference, teaches static charge retention by use of perfluoroalcohols. U.S. Pat. No. 5,814,688, herein incorporated by reference, teaches suitable static charge dissipation based chemistries.

It is also within the purview of the present invention that first and second fatty acid amide can be compounded with other softness improvement additives to obtain yet further softness improvement of the thermoplastic resin construct. Suitable softness improvement additives include inert organic materials such as insoluble carbonate salts and inorganic agents such as silicones and siloxanes, and metal oxides, specifically including titanium dioxide. Oleic compounds typically utilized in the preparation of cosmetics would also be of immediate consideration. It is also within the purview of the present invention to include suitable colorants and/or opacifiers in the melt blend.

Thermoplastic polymers suitable for compounding in accordance with the present invention include polyolefins, polyamides and polyesters. The thermoplastics may be further selected from homopolymers; copolymers, conjugates and other derivatives including those thermoplastic polymers having incorporated melt additives or surface-active agents.

Technologies capable of employing the fatty acid amide thermoplastic resin of the present invention include those which form continuous filament nonwoven fabrics, staple fiber nonwoven fabrics, continuous filament or staple fiber woven textiles, and films.

In general, continuous filament nonwoven fabric formation involves the practice of the spunbond process. A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web. The web is then at least temporarily consolidated, usually by means involving heat and pressure, such as by thermal point bonding. Using this bonding means, the web or layers of webs are passed between two hot metal rolls, one of which has an embossed pattern to impart and achieve the desired degree of point bonding, usually on the order of 10 to 40 percent of the overall surface area being so bonded.

A related means to the spunbond process for forming a layer of a nonwoven fabric is the melt blown process. Again, a molten polymer is extruded under pressure through orifices in a spinneret or die. High velocity air impinges upon and entrains the filaments as they exit the die. The energy of this step is such that the formed filaments are greatly reduced in diameter and are fractured so that microfibers of finite length are produced. This differs from the spunbond process whereby the continuity of the filaments is preserved. The process to form either a single layer or a multiple-layer fabric is continuous, that is, the process steps are uninterrupted from extrusion of the filaments to form the first layer until the bonded web is wound into a roll. Methods for producing these types of fabrics are described in U.S. Pat. No. 4,043,203, incorporated herein by reference.

Currently, many nonwoven manufacturing lines include at least two spunbond stations and optionally one or more meltblown stations in between. This enables the continuous production of a composite fabric consisting of discrete spunbond and meltblown layers. These fabrics are commonly called SMS, referring to a spunbond-meltblown-spunbond arrangement of layers. Thermal point bonding, as previously described, is typically used to consolidate such webs.

Staple fibers used to form nonwoven fabrics begin in a bundled form as a bale of compressed fibers. In order to decompress the fibers, and render the fibers suitable for integration into a nonwoven fabric, the bale is bulk-fed into a number of fiber openers, such as a garnet, then into a card. The card further frees the fibers by the use of co-rotational and counter-rotational wire combs, then depositing the fibers into a lofty batt. The lofty batt of staple fibers can then optionally be subjected to fiber reorientation, such as by air-randomization and/or cross-lapping, depending upon the ultimate tensile properties of the resulting nonwoven fabric. The fibrous batt is integrated into a nonwoven fabric by application of suitable bonding means, including, but not limited to, use of adhesive binders, thermobonding by calender or through-air oven, and hydroentanglement.

The production of conventional textile fabrics is known to be a complex, multi-step process. The production of staple fiber yarns involves the carding of the fibers to provide feedstock for a roving machine, which twists the bundled fibers into a roving yarn. Alternately, continuous filaments are formed into bundle known as a tow, the tow then serving as a component of the roving yarn. Spinning machines blend multiple roving yarns into yarns that are suitable for the weaving of cloth. Certain of the weaving yarns are transferred to a warp beam, which, in turn, contains the machine direction yarns, which will then feed into a loom. Other of the weaving yarns supply the weft or fill yarns which are the cross direction threads in a sheet of cloth. Currently, commercial high speed looms operate at a speed of 1000–1500 picks per minute, whereby a pick is a single yarn. The weaving process produces the final fabric at manufacturing speeds of 1260 inches to 1980 inches per minute.

The formation of finite thickness films from thermoplastic polymers is a well-known practice. Thermoplastic polymer films can be formed by either dispersion of a quantity of molten polymer into a mold having the dimensions of the desired end product, known as a cast film, or by continuously forcing the molten polymer through a die, known as an extruded film. Extruded thermoplastic polymer films can either be formed such that the film is cooled then wound as a completed product, or dispensed directly onto a substrate material to form a composite material having performance of both the substrate and the film layers. Examples of suitable substrate materials include other films, polymeric or metallic sheet stock and woven or nonwoven fabrics.

The application of the extruded film directly onto a substrate material imparts the substrate material with enhanced physical properties. It is known in the art that the application of a thermoplastic polymer film having suitable flexibility and porosity onto a nonwoven fabric results in a composite material having significant barrier properties and is suitable for disposable protective garment manufacture.

Extruded films utilizing the composition of the present invention can be formed in accordance with the following representative direct extrusion film process. Blending and dosing storage comprising at least two hopper loaders, one for thermoplastic polymer chip and one for pelletized fatty acid amide in thermoplastic carrier resin, feed into two variable speed augers. The variable speed augers transfer predetermined amounts of polymer chip and additive pellet into a mixing hopper. The mixing hopper contains a mixing propeller to further the homogeneity of the mixture. Basic volumetric systems such as that described are a minimum requirement for accurately blending the fatty acid amide into the thermoplastic polymer. The polymer chip and additive pellet blend feeds into a multi-zone extruder. Upon mixing and extrusion from the multi-zone extruder, the polymer compound is conveyed via heated polymer piping through a screen changer, wherein breaker plates having different screen meshes are employed to retain solid or semi-molten polymer chips and other macroscopic debris. The mixed polymer is then fed into a melt pump, and then to a combining block. The combining block allows for multiple film layers to be extruded, the film layers being of either the same composition or fed from different systems as described above. The combining block is connected to an extrusion die, which is positioned in an overhead orientation such that molten film extrusion is deposited at a nip between a nip roll and a cast roll.

When a substrate material is to receive a film layer extrusion, a substrate material source is provided in roll form to a tension-controlled unwinder. The base layer is unwound and moves over the nip roll. The molten film extrusion from the extrusion die is deposited onto the substrate material at the nip point between the nip roll and the cast roll. The newly formed base layer and film composite is then removed from the cast roll by a stripper roll and wound onto a new roll.

Breathable barrier films can be formed utilizing the improved softness imparted by the compounding of the fatty acid amides. Monolithic films, as taught in patent number U.S. Pat. No. 6,191,211, and microporous films, as taught in patent number U.S. Pat. No. 6,264,864, both patents herein incorporated by reference, represent the mechanisms of forming such breathable barrier films.

Reticulated films, such as those of patent numbers U.S. Pat. Nos. 4,381,326 and 4,329,309, are representative of macroporous films. Such macroporous films, which are typically employed as the topsheet or facing layer of a disposable feminine hygiene product, come in direct contact with the body and benefit significantly from improved softness as embodied by the present invention.

Utilizing the above discussed thermoplastic construct technologies, combinations of different thermoplastic constructs can be practiced to yield composite materials of improved softness performance. One or more thermoplastic constructs can incorporate the inclusion of two fatty acid amides, then be combined with one or more thermoplastic constructs which utilize an alternate formulation of two fatty acid amides, or includes reduced levels of fatty acid amide, or contains no fatty acid amide in the thermoplastic polymer composition.

Manufacture of homogenous or composite fabrics embodying the principles of the present invention includes the use of a blend of fibers and/or filaments having different composition. Differing thermoplastic polymers can be compounded with the same or different fatty acid amides, and with the same or different performance or softness improvement additives. Further, fatty acid amide fibers and/or filaments may be blended with fibers and/or filaments that have not been modified by the compounding of fatty acid amides. Unmodified fibers and/or filaments are selected from natural or synthetic composition, of homogeneous or mixed fiber length. Suitable natural fibers include, but are not limited to, cotton, wood pulp and viscose rayon. Synthetic fibers, which may be blended in whole or part, include thermoplastic and thermoset polymers. Thermoplastic polymers suitable for blending with fatty acid amide thermoplastic resins include polyolefins, polyamides and polyesters. The thermoplastic polymers may be further selected from homopolymers; copolymers, conjugates and other derivatives including those thermoplastic polymers having incorporated melt additives or surface-active agents. Staple lengths are selected in the range of 0.25 inch to 8 inches, the range of 1 to 3 inches being preferred and the fiber denier selected in the range of 1 to 15, the range of 2 to 6 denier being preferred for general applications. The profile of the fiber is not a limitation to the applicability of the present invention.

Fabrics made of the aforementioned polymer compositions, have a wide variety of end use applications, including hygiene, medical and industrial articles. Personal hygiene articles, which benefit from improved softness, include the construction of liners and the external barrier layers. Liners for sanitary articles, such as disposable diapers and feminine hygiene product top-sheets or facing layers, come in direct contact with the wearer of the article, and thus improved softness, in particular in terms of tactile qualities, results in improved comfort. External barrier layers of hygiene articles such as disposable diapers and incontinence protection gain improved flexibility and conformance to body contours as a result of increased softness as measured by changes in ductile qualities. Medical and Industrial protective articles, such as face masks, surgical drapes and operating gowns, as well as, clean-room garments, once again, benefit from the improved softness and thus improving the wearers comfort when such articles are worn for protracted periods of time. Cuffs construction, as is respectively practiced in the fabrication of hygiene, medical, and industrial articles, relies upon the intimate and prolonged contact with the users skin. Softness improvement in cuffs utilizing the present invention would enable such articles to maintain improved fit and function for longer durations.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A method for manufacturing a thermoplastic construct, comprising;
   a. providing a thermoplastic polymer base composition;
   b. providing a first fatty acid amide;
   c. providing a second fatty acid amide, said second fatty acid amide having a different fatty acid chain composition than said first fatty acid amide;
   d. providing a third performance-modifying additive;
   e. blending said thermoplastic polymer base and said third performance-modifying additive to provide a thermoplastic polymer base composition/performance-modifying additive composition;
   f. blending said first and second fatty acid amides into said thermoplastic polymer base composition/performance-modifying additive composition to provide a thermoplastic blend, said first fatty acid amide comprising between 10 to 90 percent by weight of the overall fatty acid amide present in said thermoplastic blend, said second fatty acid amide comprising between 90 to 10 percent by weight of the overall fatty acid amide present in said thermoplastic blend; and
   g. extruding said thermoplastic blend as a thermoplastic construct, said thermoplastic construct exhibiting an improved softness as compared to a thermoplastic construct consisting of said thermoplastic polymer base.

2. A method as in claim 1, wherein the third performance-modifying additive is a performance additive.

3. A method as in claim 1, wherein the third performance-modifying additive is a non-fatty acid amide softness additive.

4. A method for manufacturing a thermoplastic construct, comprising;
   a. providing a thermoplastic polymer base composition;
   b. providing a first fatty acid amide;
   c. providing a second fatty acid amide, said second fatty acid amide having a different fatty acid chain composition than said first fatty acid amide;
   d. providing a third performance-modifying additive;
   e. blending said first and second fatty acid amides into said thermoplastic polymer composition to provide a first blend, said first fatty acid amide comprising between 10 to 90 percent by weight of the overall fatty acid amide present in said first blend, said second fatty acid amide comprising between 90 to 10 percent by weight of the overall fatty acid amide present in said blend first;
   f. blending said first blend with said third performance-modifying additive to provide a thermoplastic blend; and
   g. extruding said thermoplastic blend as a thermoplastic construct, said thermoplastic construct exhibiting an improved softness as compared to a thermoplastic construct consisting of said thermoplastic polymer base.

5. A method as in claim 1, wherein said first and second fatty acid amides are selected from the formula:

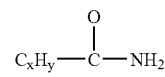

wherein x ranges from 6 to 26 and y ranges from 13 to 53.

6. A method as in claim 1, wherein the thermoplastic blend has a letdown level of 3 to 15 percent.

* * * * *